United States Patent [19]

Lowe, Sr. et al.

[11] Patent Number: 5,038,006

[45] Date of Patent: Aug. 6, 1991

[54] ELECTRICAL SWITCH

[76] Inventors: Alvin E. Lowe, Sr.; Carla L. Lowe, both of P.O. Box 306, Mulberry, Kans. 66756

[21] Appl. No.: 497,100

[22] Filed: Mar. 21, 1990

[51] Int. Cl.[5] .......................................... H01H 35/14
[52] U.S. Cl. ................................................ 200/61.5
[58] Field of Search ............ 200/61.45 R, 61.5, 61.53, 200/DIG. 29

[56] References Cited

U.S. PATENT DOCUMENTS

| | | | |
|---|---|---|---|
| 3,022,392 | 2/1962 | Clemson | 200/61.5 |
| 3,066,202 | 11/1962 | Kabela et al. | 200/61.5 |
| 3,259,202 | 7/1966 | Griffeth | 180/283 |
| 3,410,359 | 11/1968 | Mollison | 180/283 |
| 3,743,803 | 7/1973 | Roesch et al. | 200/61.5 X |
| 3,745,277 | 7/1973 | Shawcross et al. | 200/61.5 |
| 3,772,643 | 11/1973 | Dodd et al. | 340/440 |
| 3,798,399 | 3/1974 | Corporandy | 200/61.5 X |
| 3,889,774 | 6/1975 | Sehweuk | 180/283 |
| 3,916,127 | 10/1975 | Roesch et al. | 200/61.5 X |
| 4,308,438 | 12/1981 | Rossel et al. | 200/61.5 |
| 4,524,287 | 6/1985 | Brannen | 307/10.1 |

FOREIGN PATENT DOCUMENTS 1802919  2/1970  Fed. Rep. of Germany .
2552379  3/1985  France .
817224  7/1959  United Kingdom .

Primary Examiner—J. R. Scott
Attorney, Agent, or Firm—Litman, McMahon & Brown

[57] ABSTRACT

A force-actuated electrical disconnect switch for connection between major electrical components of a vehicle and an ungrounded battery terminal of the vehicle. In an operative configuration, a pendulum in coaxial alignment with a contact shaft biases a conductor plate against a pair of power terminals which allows normal electrical power to flow to the electrical components. A severe jolt, such as a collision, with a sufficient horizontal component causes the pendulum to pivot out of alignment with the contact shaft, which is thrust downwardly such that the conductor plate breaks contact with the power terminals and immediately assumes an inoperative configuration wherein the conductor plate makes contact with a pair of grounding terminals, short-circuiting the electrical components to ground. While in the inoperative configuration, a flasher and emergency light circuit is activated. A reset mechanism is adapted to restore the apparatus to its normal, operative configuration. A modified embodiment has a shaft biased against a sphere which is shifted out of alignment with the shaft during a collision, whereby a conductor plate breaks contact with a pair of power contacts and immediately thereafter makes contact with a pair of grounding contacts, shorting the electrical components to ground. A relay is adapted to elevate the shaft such that the sphere can gravitationally return to a central position, restoring the modified apparatus to an operative configuration.

2 Claims, 2 Drawing Sheets

ELECTRICAL SWITCH

BACKGROUND OF THE INVENTION

1. Field of the Invention.

The present invention relates generally to electrical switches, and in particular to an electrical switch adapted for mounting in a vehicle for electrically isolating the ungrounded side of a battery from the rest of the vehicle.

2. Description of the Related Art.

Vehicle electrical systems are adapted for providing electrical power to a variety of electrically-powered devices, such as starters, lights, fans and a wide variety of other electrical components and equipment. In a typical vehicle electrical system, the vehicle itself serves as a common or chassis ground, usually by connection to the negative side of the battery. The electrical equipment and components are operated by connecting them to the positive side of the vehicle's electrical power system, i.e. the battery positive side and/or the positive side of a generator or alternator. Many of these electrical components operate selectively, others operate continuously.

In a collision, the electrical system of a vehicle can produce hazardous sparks and short circuits, which can ignite fuel spilled from ruptured fuel tanks and fuel lines.

In that event, collisions which do not necessarily produce fatalities or serious injuries from the impact may nevertheless produce such fatalities or serious injuries if occupants thereof are unable to promptly escape from a burning vehicle.

Various devices have been developed in an attempt to interrupt or short-circuit the flow of electrical power to those components which might generate the spark that ignites the flames. In developing such a device, several objectives must be simultaneously satisfied. Besides interrupting the electrical power, the interruption must continue until corrected, regardless of the physical orientation of the vehicle after the collision. In addition, the device should be equally sensitive to any collision, regardless of the direction of impact.

A first shortcoming of many of the prior art devices is the failure to maintain the interrupted configuration until judgmental discretion has determined that potentially unsafe conditions, such as spilled fuel or the like, have passed. If a device automatically resets itself, thereby reconnecting the electrical power to the vehicular system, the purposes for installing such a system have been circumvented at a time when it is most critically needed.

A second shortcoming is the failure to provide a short-circuiting of the electrical components if the vehicle is substantially level after the collision. Many of the prior art devices are limited to performing their function only while the vehicle maintains a relatively steeply inclined orientation.

A third shortcoming arises from the use of specific rotational axes for moving parts or the use of a configuration which causes sensitivity in some directions to vary from that of other possible directions and thus do not provide uniform, omni-directional protection.

Another observed shortcoming of at least one of the prior art devices is a requirement to replace either the device or a component of the device before electrical power is once again restorable to the electrical components. If such an extra device or device component is not readily available, then the electrical connections of the vehicle would have to be modified to bypass the device in order to make the vehicle operational.

What is needed is a device which is equally omni-directionally sensitive to an impact, which remains in a tripped configuration until a determination has been made that potential danger has passed, which will trip and remain tripped even when the vehicle is upright and not in an inclined orientation, and which is self-contained whereby electrical power can be simply reconnected to the electrical components of the vehicle without replacing the device or component parts thereof.

SUMMARY OF THE INVENTION

An electrical switch apparatus is provided for eliminating the danger of post-collision fires arising from a spark from an electrical system. The electrical switch apparatus is mounted in close proximity to a battery of a vehicle and is connected between the ungrounded terminal of the battery and the major electrical components of the vehicle. The apparatus comprises a pair of power terminals, one of which is connected to the ungrounded battery terminal and the other is connected to the electrical components. When the apparatus is in its operative configuration, a conductor plate interconnects the pair of power terminals such that current can flow uninterruptedly from the battery to the electrical components.

The conductor plate is held in place by a spring-loaded contact shaft in coaxial alignment with a pendulum shaft. The pendulum shaft is mounted in a swivel which permits the pendulum shaft to rotate about a generally horizontal axis.

The apparatus further comprises a pair of grounding terminals, one of which is connected to a grounded terminal of the battery, or to the vehicle, and the other is connected to the electrical components.

When the apparatus is subjected to a sudden impact with a horizontal force component, such as in a collision, the inertial characteristics of the weighted pendulum cause the pendulum shaft to tilt and provide sufficient clearance such that the spring-loaded contact shaft is thrust axially downwardly, breaking contact with the pair of power terminals and, immediately thereafter, establishing contact between the pair of grounding contacts. Thus the electrical components of the vehicle are almost instantaneously connected to ground immediately following the impact. The apparatus is then in a tripped or inoperative configuration.

When the apparatus assumes its inoperative configuration, electric current is caused to flow through a circuit containing a flasher and an emergency light to indicate that the apparatus has assumed such inoperative configuration.

When it is desired to reset the apparatus to its operative configuration, a reset mechanism is adapted whereby the contact shaft can be manually elevated whereby the conductor plate is caused to break electrical contact with the grounding terminals and reestablish electrical contact across the power terminals. While the contact shaft is manually elevated, sufficient clearance is provided between the contact shaft and the pendulum shaft whereby the latter is rotated into coaxial re-alignment with the former by a self-centering spring. The self-centering spring is adapted to provide re-setting capability even when the apparatus is inclined, such as when the vehicle is sitting on a slope. After such re-alignment, the reset mechanism is released whereby current can again flow normally between the ungrounded battery terminal and the electrical components of the vehicle.

A modified embodiment of the present invention has a shaft with a concave-shaped distal end thereof biased against a sphere. While so biased, a conductor plate is springingly biased against a pair of power terminals, thereby forming an operative configuration whereby electrical current can flow from an ungrounded battery terminal to electrical components of a vehicle.

When subjected to an impact with sufficient horizontal impact, the sphere is caused to shift sufficiently sidewise whereby sufficient clearance is provided for the shaft to be thrust axially downwards, causing the conductor plate to break electrical contact with the pair of power terminals and to establish electrical contact with a pair of grounding terminals, thereby assuming a tripped or inoperative configuration. In the inoperative configuration, the electrical components are connected to ground.

When it is desired to reset the modified apparatus to its operative configuration, a normally open switch is closed, causing electrical current to flow through a relay which is adapted to attract the shaft sufficiently axially upwardly to clear the sphere. An inner surface of the apparatus casing is concave downwardly such that the elevation of the shaft allows the sphere to gravitationally return to a central position in alignment with the shaft. The concavity is adapted to provide re-setting capability even when the modified apparatus is inclined, such as when the vehicle is sitting on a slope. Then the switch is allowed to return to its normally open position and the modified apparatus is again in its operative configuration.

OBJECTS OF THE INVENTION

Therefore, the objects of the present invention are as follows: to provide a force-actuated electrical switch apparatus for automatically shorting the electrical components of a vehicle to common ground when the switch is abruptly jolted; to provide such an apparatus which is adapted to prevent post-collision fires; to provide such an apparatus which can assume and remain in a tripped configuration even when the vehicle is upright and not in an inclined orientation; to provide such an apparatus which is equally omni-directionally sensitive; to provide such an apparatus which does not automatically reset itself; to provide such an apparatus which is manually resettable from a tripped or inoperative configuration to an operative configuration; to provide such an apparatus which can normally restore electrical power connections to the electrical components of the vehicle without replacing the apparatus or component parts thereof; to provide such an apparatus which provides a signal when the apparatus has assumed its inoperative configuration; to provide such an apparatus which is readily insertable between the power and ignition systems on existing vehicles or other equipment without costly modification thereof; and to generally provide such an apparatus which is compact, self-contained, easy to maintain, inexpensive to manufacture, simple to operate, reliable in performance, and generally performs its intended purpose.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

DETAILED DESCRIPTION OF THE INVENTION

Figure 1:
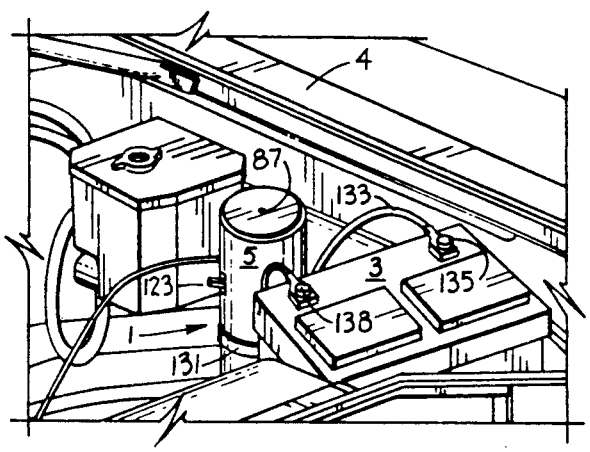
FIG. 1 is a perspective view of an electrical switch apparatus installed in a vehicle in accordance with the present invention.
Figure 3A:
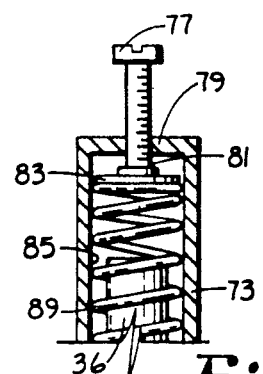
FIG. 3a is an enlarged and fragmentary cross-sectional view of a biasing adjustment mechanism of the electrical switch apparatus.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

The reference numeral 1 generally refers to a force-actuated electrical disconnect switch or electrical switch apparatus in accordance with the present invention. The electrical switch apparatus 1 is shown mounted in close proximity to a battery 3 in a vehicle 4. The switch apparatus 1 comprises a housing or casing 5 having a substantially enclosed cavity 6. The apparatus 1 has a movable contact or contactor assembly 9, a pendulum triggering mechanism 12, and a reset mechanism 13.

The casing 5 is preferably cylindrically shaped with a wall 15, a top 17 and a bottom 19 and is constructed of an electrically non-conductive material which is capable of withstanding the mechanical and thermal environment which exists in the vicinity of a prime mover, such as an engine in the vehicle 4. Contained within the cavity 6 is an upper power terminal mounting plate 23, an intermediate grounding terminal mounting plate 25, and a bottom pendulum mounting plate 27. Each of the plates 23, 25 and 27 is substantially perpendicular to an axis A of the casing 5 and is rigidly spaced relative to each other by securement to the wall 15 of the casing 5, such as by insertion in a groove 29, by adhesion, or the like.

The contactor assembly 9 comprises a pair of power terminals 31, a pair of grounding terminals 33, and a movable contact or conductor plate 35. Lower surfaces of the terminals 31, cooperatively forming an upper contact area, are relatively coplanar and are spaced substantially perpendicularly to the axis of a contact shaft 36. The contact shaft 36 is constructed of stainless steel or other suitable material.

Preferably, the plate 35 is circularly shaped and is rigidly secured to an axial receiver or sleeve 37 positioned in an axial bore (not shown) through the plate 35. The sleeve 37 is constructed of dielectric or other electrically non-conductive material. An axial bore (not shown) through the sleeve 37 has a diameter slightly greater than the diameter of the contact shaft 36 passing therethrough such that the sleeve 37 can freely and reciprocably slide therealong.

A spring 38, encircling the contact shaft 36, is imposed between the sleeve 37 and a ring 39 which is rigidly secured to the contact shaft 36. The contact shaft 36 is further slidably secured in a coaxial receiver 40, which is centrally spaced and rigidly secured to the plate 25.

Figure 4:
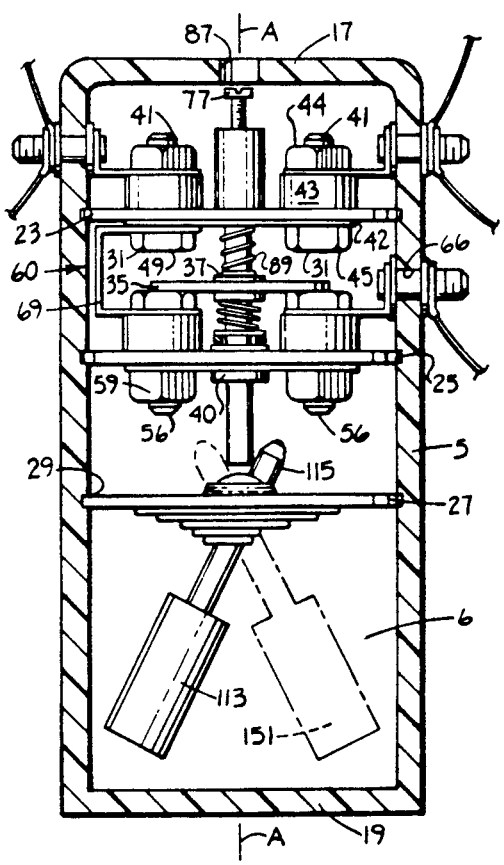
FIG. 4 is an enlarged cross-sectional view of the electrical switch apparatus in a grounded configuration.

Each of the power terminals 31 is constructed of electrically conductive material and is rigidly secured to the power terminal mounting plate 23, such as by passing each of a pair of bolts 41 through a bore (not shown) in a non-conductive plate 42, a bore (not shown) in the plate 23, and a hollow bushing 43, which are cooperatively adapted to electrically isolate each of the terminals 31 from the plate 23. Each of the bolts 41 is rigidly secured in place with a nut 44 as shown in FIG. 4.

One of the power terminals 31, such as a first fixed contact or power terminal 45, is internally electrically connected to a battery connector post 46 with a battery conductor 47. The post 46 is inserted through a bore 48 in the wall 15 and is rigidly secured thereto. The other power terminal 31, such as a second fixed contact upper contact area or power terminal 49, is internally electrically connected to a system connector post 51 with a system conductor 52. The post 51 is inserted through a bore 53 in the wall 15 and is rigidly secured thereto.

Similarly, each of the grounding terminals 33, such as a secondndixed contact lower contact area 54 and a third fixed contact 55, is constructed of electrically conductive material and is rigidly secured to the grounding terminal mounting plate 25, such as by passing each of a pair of bolts 56 through a hollow bushing 57, a bore (not shown) in the plate 25, and a non-conductive plate 58, which are cooperatively adapted to electrically isolate each of the terminals 33 from the plate 25. Each of the bolts 56 is rigidly secured in place with a nut 59, as shown in FIG. 4.

Upper surfaces of the terminals 33, cooperatively forming a lower contact area, are relatively coplanar and are spaced substantially perpendicularly to the axis of the contact shaft 36. The terminals 33 are vertically spaced from the terminals 31 such that a gap 60 with a vertical width substantially greater than the thickness of the contact plate 35 exists therebetween.

One of the grounding terminals 33, such as the grounding terminal 55, is internally electrically connected to a grounding connector post 63 with a grounding conductor 65. The post 63 is inserted through a bore 66 in the wall 15 and is rigidly secured thereto. The other grounding terminal 33, such as the grounding terminal 54, is internally electrically connected to the power terminal 49 with a shunting conductor 69.

The contact shaft 36 is slidably secured in a thimble 73 with a lower open end 75, which is aligned with bores (not shown) through the plates 23 and 42. An adjustment screw 77 is threadedly secured in an upper end 79 of the thimble 73. A distal end 81 of the screw 77 is rigidly secured to a stop 83 which has a diameter slightly less than an inside diameter 85 of the thimble 73. A bore 87 through the top 17 of the casing 5 provides access for turning the screw 77.

A spring 89, with an outside diameter slightly less than the inside diameter 85 of the thimble 73 and with an inside diameter slightly greater than the diameter of the contact shaft 36, is confined between the stop 83 and the sleeve 37 such that the spring 89 exerts a bias axially along the contact shaft 36 against the sleeve 37. When the spring 89 is compressed in an operational configuration of the electrical switch apparatus 1 as hereinafter described, the plate 35 simultaneously bears against and makes good electrical contact with both of the pair of power terminals 31. When the spring 89 is extended in a triggered configuration as hereinafter described, the plate 35 simultaneously bears against and makes good electrical contact with both of the pair of grounding terminals 33. Turning the screw 77 adjusts the force exerted by the spring 89 against the sleeve 37.

Figure 3:
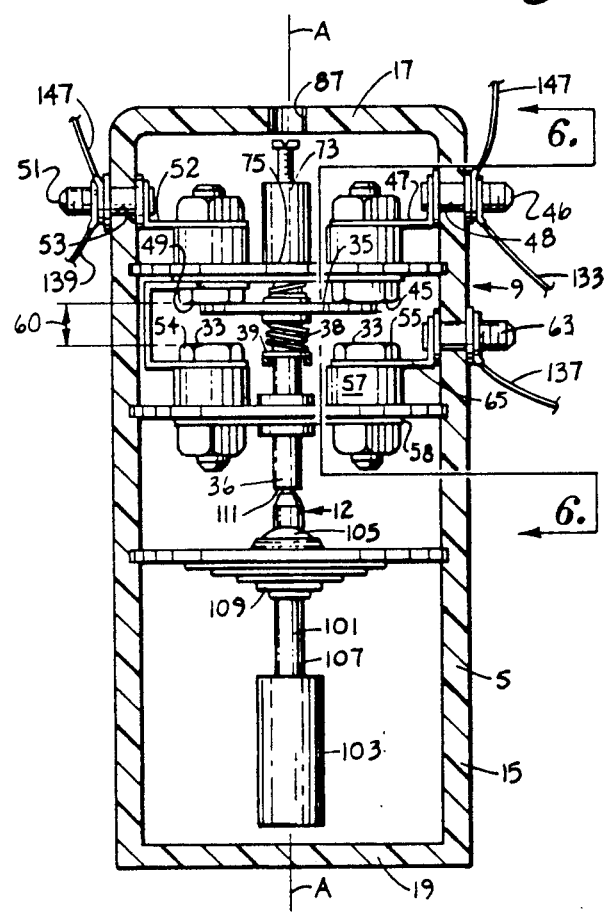
FIG. 3 is an enlarged cross-sectional view of the electrical switch apparatus in an operational configuration, showing a weighted pendulum triggering mechanism.
Figure 2:
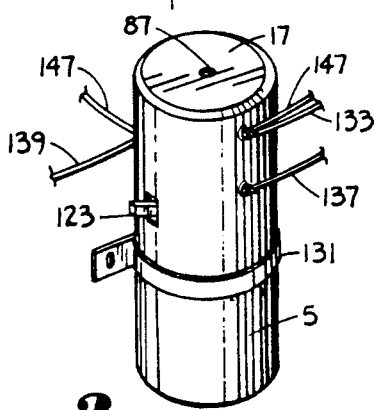
FIG. 2 is an enlarged perspective view of the electrical switch apparatus.

A tripping means, such as the triggering mechanism 12, comprises a pendulum tripping means, such as a pendulum shaft 101, a suspended pendulum weight or bob 103 and a swivel 105, as shown in FIG. 3. The swivel 105, such as a ball and socket joint, or the like, spaced intermittently between upper and lower ends of the pendulum shaft 101, is pivotally mounted in a receiver, such as a centrally situated bore (not shown) through the mounting plate 27. The bob 103 is rigidly secured to a distal end 107 of the pendulum shaft 101. A centering spring 109 in cooperation with the swivel 105 is adapted to bias the pendulum shaft 101 to a generally vertical orientation, as shown in FIG. 3. The centering spring 109 is adapted to provide resetting capability even when the apparatus 1 is inclined, such as when the vehicle 4 is sitting on a slope.

When the apparatus 1 is in its operative configuration, as shown in FIG. 3, the pendulum shaft 101 is axially aligned with the contact shaft 36 and bears against a distal end face 111 of the contact shaft 36, thereby forming an engage position, as shown in FIG. 3. The spacing of the pendulum shaft 101 in the operative configuration is adapted to elevate the conductor plate 35 such that it bears against and makes good electrical contact simultaneously with the power terminals 31.

When a lateral or transverse impulse is imparted to the apparatus 1, such as during a collision or the like, the bob 103 and pendulum shaft 101 are adapted to cooperatively tilt sidewise about a generally horizontal rotational axis to a release position, as referenced by the numeral 113 in FIG. 4, by pivoting about the swivel 105 as a result of the inherent inertial properties of the bob 103, such that an upper end 115 of the pendulum shaft 101 is no longer aligned with the contact shaft 36, but has been displaced to allow sufficient clearance for the spring 89 to push the contact shaft 36 axially downwardly, thrusting the conductor plate 35 through the gap 60 until the conductor plate simultaneously bears against, and makes good simultaneous electrical contact with, the grounding terminals 33.

The upper end 115 of the pendulum shaft 101 has a convex profile or bevel 117 and contains a captive ball bearing 115 to facilitate sidewise displacement of the pendulum shaft 101 relative to the contact shaft distal end 111, as shown in FIG. 4. The end face 111 of the contact shaft 36 is slightly concave to assist with retention of the ball 119 therein in the engaged or operative configuration of the apparatus 1. Alternatively, the end face 111 may be perpendicularly planar relative to the axis of the contact shaft 36. Caution must be asserted with this alternative, however, because the apparatus 1 may be too sensitive such that driving on a steep incline might cause the apparatus 1 to assume its inoperative configuration.

Figure 6:
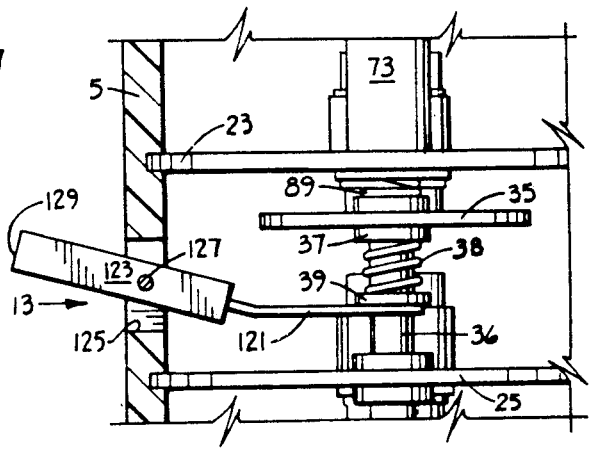
FIG. 6 is an enlarged and fragmentary cross-sectional view taken along line 6—6 of FIG. 3.

Spaced about the contact shaft 36 and below the ring 39 is the distal end of a lever arm 121 which is rigidly secured to a reset handle 123. The reset handle 123 extends through a rectangularly shaped aperture 125 in the wall 15 of the casing 5. The reset handle 123 is secured about a pin 127 which is adapted to pivotally and rotatably secure the reset handle 123 in the aperture 125, as shown in FIG. 6. The reset handle 123 is adapted to elevate the sleeve 37 with the plate 35 from a spacing where the plate 35 bears against the grounding terminals 33 to a spacing where the plate 35 bears against the power terminals 31 and where the contact shaft distal end 118 is also spaced sufficiently upwardly to permit the pendulum shaft 101 to return to an upright configuration by urging a distal end 129 of the reset handle 123 downwardly.

An anchoring means, such as an encircling strap bracket 131, is provided to securely and reliably anchor the electrical switch apparatus 1 to the vehicle 4.

A battery lead 133 provides an electrical connection between the battery post 46 and an ungrounded terminal of the battery 3, such as the battery terminal referenced by numeral 135 in FIG. 1. A grounding lead 137 provides electrical connection between the grounding post 63 and the vehicle 4 or a grounded terminal of the battery 3, such as terminal 138 in FIG. 1.

Figure 7:
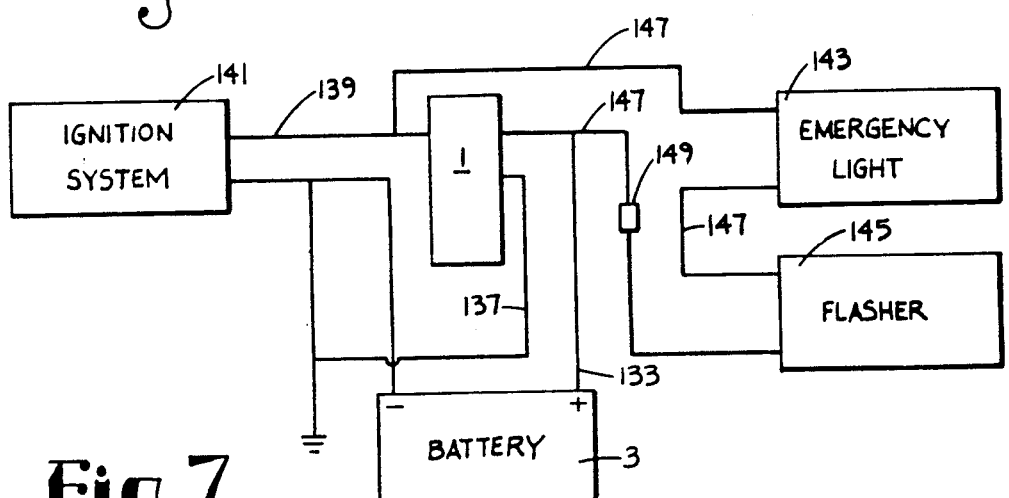
FIG. 7 is a schematic diagram of the electrical switch apparatus with associated circuitry when installed in a vehicle.

A system lead 139 provides electrical connection between the system post 51 and an ungrounded portion of a major electrical component of the vehicle 4, such as the ignition system 141, as illustrated in FIG. 7. An emergency light 143 and a flasher 145 are connected in series in a signal lead 147 connected between the battery post 46 and the system post 51. A fuse holder and fuse 149 are inserted in series in the signal lead 147.

In an actual application of the electrical switch apparatus 1, the apparatus 1 must be installed in the vehicle 4 in an upright orientation such that the pendulum shaft 101 and the contact shaft 36 are in substantially vertical coaxial alignment, which is the operational configuration as shown in FIG. 3. If the pendulum shaft 101 is not in vertical alignment with the vertically oriented contact shaft 36, then the externally exposed end 129 of the reset handle 123 is urged downwardly which lifts the plate 35 and contact shaft 36 upwardly until the spring 38 is partially compressed due to the interference of the contacts 31 with the upward displacement of the plate 35 such that the lower end 111 of the contact shaft 36 is at a higher elevation than the highest point of the ball 119 in the upper end 115 of the pendulum shaft 101 when it is in vertical alignment. Then, the bob 103 causes the pendulum shaft 101 to pivot at the swivel 105 and orient itself vertically in coaxial alignment with the contact shaft 36. The reset handle 123 is then released and the shaft end 111 then rests against the ball 119. The spring 38 is then partially compressed such that good electrical contact is maintained between the plate 35 and both of the power terminals 31, thereby placing the apparatus 1 in its operative configuration.

In the operative configuration, power from the battery 3 flows consecutively through the battery lead 133, the battery post 46, the battery conductor 47, the battery power terminal 45, the plate 35, the system power terminal 49, the system conductor 52, the system post 51, and the system lead 139. In this configuration, the vehicle 4 will operate normally as it otherwise would if the apparatus 1 had not been installed.

However, if the apparatus 1 is subjected to a lateral force or sidewise jolt, such as might occur if the vehicle 4 were involved in an accident, the bob 103 will move out of axial alignment with the contact shaft 36. If the impact is from the left, the bob 103 will assume the configuration 113 shown in FIG. 4; if the impact is from the right, the bob 103 will assume the configuration shown in phantom in FIG. 4 as referenced by the numeral 151. The swivel 105 is adapted to be omni-directional such that a correspondingly equivalent reaction will be obtained regardless of the direction of the horizontal component of the impact.

If the impact is sufficiently substantial, such as that corresponding to the configurations 113 and 151, the pendulum shaft upper end 115 is disposed sufficiently sidewise to clear the shaft lower end 111 such that the spring 89 will urge the contact shaft 36 and plate 35 downwardly, breaking electrical contact between the plate 35 and the terminals 31 which, in turn, disconnects the electrical system of the vehicle 4 from the ungrounded terminal 135 of the battery 3.

The spring 89 continues to urge the contact shaft 36 and plate 35 downwardly until the plate 35 simultaneously bears against the terminals 33. The spring 89 is adapted to continue to apply sufficient downward biasing force such that the plate 35 makes good electrical contact between the plate 35 and the terminals 33. The apparatus 1 is then in its disengaged or inoperative configuration, as shown in FIG. 4, wherein the electrical system of the vehicle 4 is connected to ground through the system lead 139, the system conductor 53, the system terminal 49, the shunting conductor 69, the leftmost grounding terminal 33, the plate 35, the rightmost grounding terminal 33, the grounding conductor 65, the grounding post 63, and the grounding lead 137, thereby short-circuiting the electrical system of the vehicle 4.

When the apparatus 1 is in its tripped or inoperative configuration, the system post 51 is connected to ground as aforesaid. Since the signal lead 147 is connected between the system post 51 and the battery post 46 which is connected to the ungrounded terminal 135 of the battery 3, electrical current is caused to flow through the signal lead 147 which activates the flasher 145 which, in turn, causes the emergency light 143 to sequentially flash on and off indicating that the apparatus 1 is in its inoperative configuration. After the danger, which caused the triggering of the apparatus 1, has passed, the reset handle 123 may be manipulated as aforesaid to return the apparatus 1 to its operative configuration in order that normal electrical power is again be restored to the vehicle 4.

Figure 8:
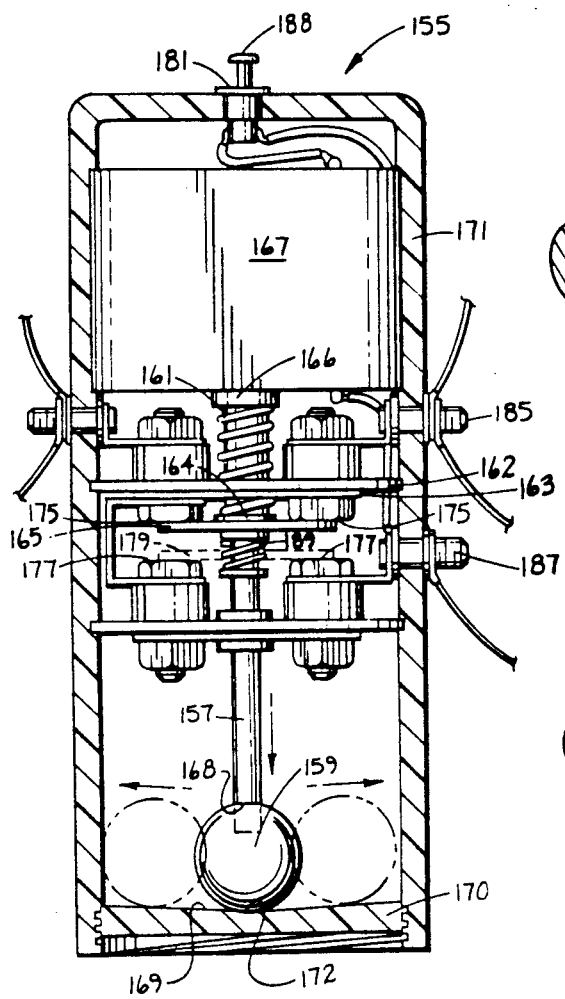
FIG. 8 is a cross-sectional view of a modified electrical switch apparatus shown in an operational configuration in solid lines and in a grounded configuration in phantom lines, according to the present invention.
Figure 5:
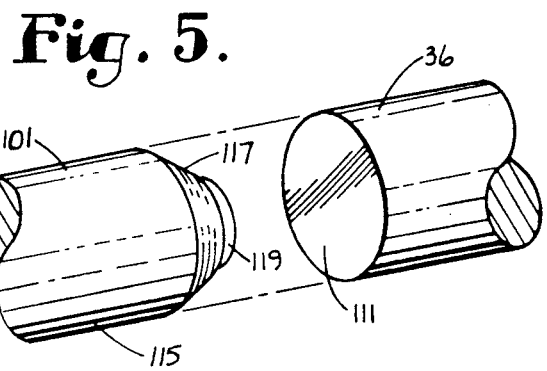
FIG. 5 is an enlarged and fragmentary exploded perspective view of a trigger mechanism of the electrical switch apparatus.

A modified embodiment of an electrical switch apparatus 155 in accordance with the present invention is shown in FIG. 8. Many of the characteristics of the modified embodiment are substantially similar to those previously described and will not be reiterated here.

Instead of a pivoting pendulum as previously described, a vertically oriented shaft 157 is biased against a sphere 159 by a partially compressed spring 161. The spring 161 encircles the shaft 157 and passes through aligned bores (not shown) in a mounting plate 162 and an electrically nonconductive plate 163. The spring 161 is sandwiched between a first hollow sleeve 164, which is rigidly centrally secured to a plate 165, and a second hollow sleeve 166, which is rigidly secured to and aligned with an axial hollow cavity (not shown) in an electromagnetic device, such as a relay 167. The shaft 157 passes through and is axially slidably secured by the bores through the sleeves 164 and 166.

Preferably, a distal end 168 of the shaft 157 is slightly concave to restrain the apparatus 155 in its normal, operative configuration. An inner surface 169 of a bottom 170 of a housing or casing 171 of the apparatus 155 is also slightly concave such that the sphere 159, if uninhibited by the shaft 157, will gravitationally seek a center 172 of the bottom surface 169 in axial alignment with the shaft 157. The concavity of the surface 169 is adapted to provide re-setting capability even when the modified apparatus 155, such as when a vehicle in which the apparatus 155 has been installed is sitting on a slope.

When the apparatus 155 experiences an impact having a horizontal component, the inherent inertial properties of the sphere 159 will cause it to shift, relative to the shaft 157, toward the impact. If the impact has sufficient magnitude, the sphere 159 will be sufficiently displaced sidewise, such as one of the dotted configurations referenced as 172 in FIG. 8, such that clearance is provided for vertically downward axial movement by the shaft 157. In that event, the end 168 of the shaft 157 is urged downwardly by the spring 161, pushing the conductor plate 165 away from a pair of power terminals 175 and continuing the downward motion of the shaft 157 until the plate 165 is firmly biased against a pair of grounding terminals 177 making good electrical contact therewith, as indicated by the dotted outline referenced by the numeral 179 in FIG. 8.

The apparatus 155 comprises a normally open switch 181 which is electrically connected in series with the relay 167 which is electrically connected across a battery connecting post 185 and a grounding post 187. The relay 167, when activated by pressing downwardly on the switch plunger 188, is adapted to pull upwardly on the shaft 157 with sufficient force to bias the plate 165 against the power terminals 175 and to partially compress a spring 189 such that the shaft distal end 168 is sufficiently elevated to permit the sphere 159 to gravitationally return to the center 172 of the casing bottom 170.

Thus, to reset the apparatus 155 when it is in an inoperative configuration, as illustrated by the phantom lines in FIG. 8, the switch 181 is closed causing current to flow through the relay 167, which elevates the shaft 157. After a relatively short time which is sufficient to allow the sphere 159 to return to the bottom center 172 as aforesaid, the switch 181 is released and allowed to return to its normally open configuration, which interrupts current flow through the relay 167 whereupon the shaft 157 is urged downwardly by the spring 189 such that the shaft end 168 is biased against the sphere 159, placing the apparatus in an operative configuration as shown in FIG. 8. In such operative configuration, the spring 189 is still sufficiently partially compressed to bias the plate 165 against the power terminals 175 in order to make good electrical contact therewith.

It is foreseen that the apparatus of the present invention can be relatively compact and used for its intended purpose in a variety of applications without substantial modification thereof, such as in automobiles, trucks, tractors, airplanes, and almost any other vehicle or piece of equipment carrying flammable materials which may unexpectedly be exposed to a spark or discharge from electrical systems or components therein.

What is claimed and desired to be secured by Letters Patent is as follows:

1. In combination with a vehicle electrical system including a battery with ungrounded and grounded terminals and a plurality of electrically-powered devices, the improvement of a force-actuated electrical disconnect switch, which comprises:
   (a) a housing including an interior with upper and lower portions;
   (b) an upper plate mounted in said interior upper portion;
   (c) an intermediate plate mounted in said housing interior between said upper and lower portions thereof;
   (d) a lower plate mounted in said interior lower portion;
   (e) said upper and intermediate plates each including a respective, coaxial receiver;
   (f) a first fixed contact mounted on said upper plate and electrically connected to said battery ungrounded terminal;
   (g) a second fixed contact including an upper contact area connected to said upper plate and a lower contact area connected to said intermediate plate;
   (h) a third fixed contact electrically connected to said battery grounded terminal;
   (i) said first fixed contact and said second fixed contact upper contact area being generally coplanar;
   (j) said second fixed contact lower contact area and said third fixed contact being generally coplanar and positioned in spaced relation below said first fixed contact and said second fixed contact upper contact area whereby a clearance space is provided therebetween;
   (k) a movable contact assembly, which includes:
      (1) a contact shaft slidably, reciprocably extending through said intermediate plate receiver and including upper and lower ends positioned in said housing interior upper and lower portions respectively;
      (2) a movable contact mounted on said contact shaft upper end and positioned in said clearance space;
      (3) said movable contact including a receiver reciprocably receiving said contact shaft;
      (4) an upper contact spring positioned between said upper plate and said contact and positively biasing said contact assembly downwardly; and
      (5) a lower spring engaging said movable contact and said contact shaft, said lower contact spring positively biasing said movable contact upwardly;
   (l) a pendulum tripping assembly including:
      (1) a pendulum shaft having an upper end positioned above said lower plate and a lower end positioned below said lower plate, said pendulum shaft extending through said lower plate receiver;

(2) a swivel bearing mounted in said lower plate receiver and connected to said pendulum shaft intermediate its upper and lower ends, said swivel bearing being mounted so that said pendulum shaft generally moves between a generally vertical engage position with said pendulum shaft upper end engaging said movable contact shaft lower end and a tilted release position with said pendulum shaft upper end disengaged from said movable contact shaft lower end;

(3) a centering spring mounted on said lower plate and connected to said pendulum shaft, said centering spring being biasing said pendulum shaft to its engage position; and (4) a pendulum weight mounted on said pendulum shaft lower end;

(m) a first position with said pendulum tripping assembly in its engage position and said movable contact electrically connecting said first fixed contact and said second fixed contact upper contact area; and (n) a second position with said pendulum tripping assembly in its release position and said movable contact electrically connecting said second fixed contact lower contact area and said third fixed contact.

2. In combination with a vehicle electrical system including a battery having ungrounded and grounded terminals and a plurality of electrically-powered devices each having ungrounded and grounded terminals, the improvement of a force-actuated electrical disconnect switch, comprising:

(a) a housing having a cavity with upper and lower portions;

(b) an upper plate mounted in said cavity upper portion;

(c) an intermediate plate mounted between said cavity upper and lower portions;

(d) a housing bottom defining a lower end of said cavity; said housing bottom having a slightly concave upper surface;

(e) said upper and intermediate plates each having a respective, coaxial receiver;

(f) a first fixed contact mounted on said upper plate and electrically connected to said battery ungrounded terminal;

(g) a second fixed contact including an upper contact area connected to said upper plate and a lower contact area connected to said intermediate plate;

(h) a third fixed contact electrically connected to said battery grounded terminal;

(i) said first fixed contact and said second fixed contact upper contact area being generally coplanar;

(j) said second fixed contact lower contact area and said third fixed contact being generally coplanar and spaced in spaced relation below said first fixed contact and said second fixed contact upper contact area whereby a clearance space is provided therebetween;

(k) a movable contact assembly, which includes:
 (1) a contact shaft slidably, reciprocably extending through said intermediate plate receiver and including upper and lower ends spaced in said cavity upper and lower portions respectively;
 (2) a movable contact mounted on said contact shaft upper end and spaced in said clearance space;
 (3) said movable contact including a receiver reciprocably receiving said contact shaft;
 (4) an upper contact spring spaced between said upper plate and said contact and adapted to positively bias said contact assembly downwardly; and
 (5) a lower spring engaging said movable contact and said contact shaft, said lower contact spring being adapted to positively bias said movable contact upwardly;

(1) a tripping assembly including a sphere spaced above said housing bottom and below said intermediate plate;

(m) a first position with said sphere substantially in alignment with said contact shaft such that said contact shaft bearing substantially radially thereagainst in an engage position; said sphere and said contact shaft cooperatively biasing said movable contact against said first fixed contact and said second fixed contact upper contact area in said engage position; and (n) a second position with said sphere substantially misaligned with said contact shaft in a release position; said sphere and said contact shaft cooperatively allowing said movable contact to be biased against said second fixed contact lower contact area and said third fixed contact in said release position.

* * * * *